(12) United States Patent
Lee et al.

(10) Patent No.: US 12,279,048 B2
(45) Date of Patent: Apr. 15, 2025

(54) ENHANCING REMOSAICED IMAGES

(71) Applicant: SAMSUNG ELECTRONICS CO., LTD., Suwon-si (KR)

(72) Inventors: Hun Soo Lee, Seongnam-si (KR); Byung Wook Jung, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 18/051,730

(22) Filed: Nov. 1, 2022

(65) Prior Publication Data

US 2023/0145321 A1  May 11, 2023

(30) Foreign Application Priority Data

Nov. 8, 2021 (KR) .................. 10-2021-0152344
Jan. 27, 2022 (KR) .................. 10-2022-0011965

(51) Int. Cl.
| | |
|---|---|
| H04N 23/80 | (2023.01) |
| H04N 23/617 | (2023.01) |
| H04N 23/62 | (2023.01) |
| H04N 23/81 | (2023.01) |
| H04N 23/82 | (2023.01) |
| H04N 25/13 | (2023.01) |

(52) U.S. Cl.
CPC .......... *H04N 23/80* (2023.01); *H04N 23/617* (2023.01); *H04N 23/62* (2023.01); *H04N 23/81* (2023.01); *H04N 23/82* (2023.01); *H04N 25/134* (2023.01)

(58) Field of Classification Search
None
See application file for complete search history.

(56) References Cited

U.S. PATENT DOCUMENTS

| | | | |
|---|---|---|---|
| 8,665,347 B2 | 3/2014 | Miyawaki et al. | |
| 10,475,237 B2 | 11/2019 | Hata | |
| 10,510,144 B2 | 12/2019 | Zur | |
| 10,922,799 B2 | 2/2021 | Hiasa | |
| 2005/0088550 A1* | 4/2005 | Mitsunaga | H04N 25/135 |
| | | | 348/E9.01 |
| 2013/0057734 A1* | 3/2013 | Tachi | H04N 25/615 |
| | | | 348/E9.037 |
| 2014/0347528 A1* | 11/2014 | Tachi | H04N 25/133 |
| | | | 348/242 |

(Continued)

FOREIGN PATENT DOCUMENTS

| | | |
|---|---|---|
| JP | 2020047170 | 3/2020 |
| JP | 2020092302 | 6/2020 |

(Continued)

*Primary Examiner* — Paul M Berardesca
(74) *Attorney, Agent, or Firm* — F. Chau & Associates, LLC

(57) ABSTRACT

According to an embodiment of the present inventive concept, an image sensor includes a sensor including a plurality of pixels and configured to capture incident light and generate raw image data; a pre-processing processor configured to generate first image data by applying a first function to the raw image data; an image processor configured to receive the first image data and generate second image data using a machine learning model; and a post-processing processor configured to generate third image data by applying a second function to the second image data, wherein the first function is a non-linear function.

18 Claims, 14 Drawing Sheets

(56) References Cited

U.S. PATENT DOCUMENTS

| | | | |
|---|---|---|---|
| 2015/0312538 A1* | 10/2015 | Nashizawa | H04N 9/646 |
| | | | 348/256 |
| 2020/0285901 A1 | 9/2020 | Hiasa | |
| 2020/0322530 A1* | 10/2020 | Choi | H04N 21/234363 |
| 2021/0006755 A1* | 1/2021 | Kim | G06T 3/4046 |
| 2022/0132001 A1* | 4/2022 | Dinh | G06F 18/40 |
| 2022/0182537 A1* | 6/2022 | Kim | H04N 23/63 |
| 2022/0207680 A1* | 6/2022 | Wang | G06T 5/73 |
| 2022/0345606 A1* | 10/2022 | Sato | H04N 25/589 |
| 2023/0065837 A1* | 3/2023 | Venkatesan | G06T 3/4046 |

FOREIGN PATENT DOCUMENTS

| | | |
|---|---|---|
| JP | 2021097278 | 6/2021 |
| KR | 10-2021-0020476 | 2/2021 |

\* cited by examiner

ENHANCING REMOSAICED IMAGES

CROSS-REFERENCE TO RELATED APPLICATIONS

This U.S. non-provisional application claims priority under 35 U.S.C. § 119 to Korean Patent Application No. 10-2021-0152344, filed on Nov. 8, 2021, and to No. 10-2022-0011965, filed on Jan. 27, 2022, in the Korean Intellectual Property Office, the disclosures of which are incorporated by reference herein in their entirety.

TECHNICAL FIELD

The present disclosure relates to an image sensor and an image processing system.

DISCUSSION OF THE RELATED ART

Digital cameras are included as a functional component in many electronic devices, such as mobile phones, gaming systems, and even cars. The digital cameras may generally be referred to as image processing systems, and include lens elements and a digital image sensor. The image processing system may photograph an object and transmit image data conforming to a specific format to an image signal processor. For example, the image sensor of the image processing system may transmit a photographing result to the image signal processor as Bayer format image data or to the image signal processor as tetra (or quad) format image data.

When the image signal processor supports only the Bayer format, in order for the image processing processor to process the tetra format image data, a remosaic operation for converting the tetra format image data into the Bayer format is required. This is because the pixel arrangement of the Bayer format is different from that of the tetra format. The remosaic operation moves pixels to a different position in order to change the pixel arrangement of the tetra format to the pixel arrangement of the Bayer format, and in conventional systems, this results in information loss and resolution degradation.

SUMMARY

Aspects of the present disclosure provide an image sensor that outputs output image data with increased quality.

Aspects of the present disclosure also provide an image processing system that outputs output image data with increased quality.

According to an embodiment of the present inventive concept, an image sensor includes a sensing unit configured to capture incident light and generate raw image data therefrom; a pre-processing processor configured to generate first image data by applying a first function to the raw image data; an image processor configured to receive the first image data and generate second image data using a machine learning model; and a post-processing processor configured to generate third image data by applying a second function to the second image data, wherein the first function is a non-linear function.

According to an embodiment of the present inventive concept, an image processing system includes an image sensor including a plurality of pixels, a pre-processing processor configured to generate first image data by applying a first function to raw image data generated from the plurality of pixels, an image processor configured to receive the first image data and generate second image data by applying a machine learning model to the first image data, and a post-processing processor configured to generate third image data by applying a second function to the second image data; and an image signal processor configured to receive the third image data as input image data and generate output image data by applying a third function to the input image data, wherein the third function is a non-linear function.

According to an embodiment of the present inventive concept, an image processing system includes an image sensor including a pre-processing processor configured to generate first image data by applying a first function to raw image data generated from a plurality of pixels, an image processor configured to receive the first image data and generate second image data by applying a deep learning model to the first image data, and a post-processing processor configured to generate third image data by applying a second function to the second image data; and an image signal processor configured to receive the third image data as input image data and generate output image data by applying a third function to the input image data, wherein the first function, the second function, and the third function are non-linear functions.

It should be noted that objects of the present invention are not limited to the above-described objects, and other objects of the present invention will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

Figure 1:
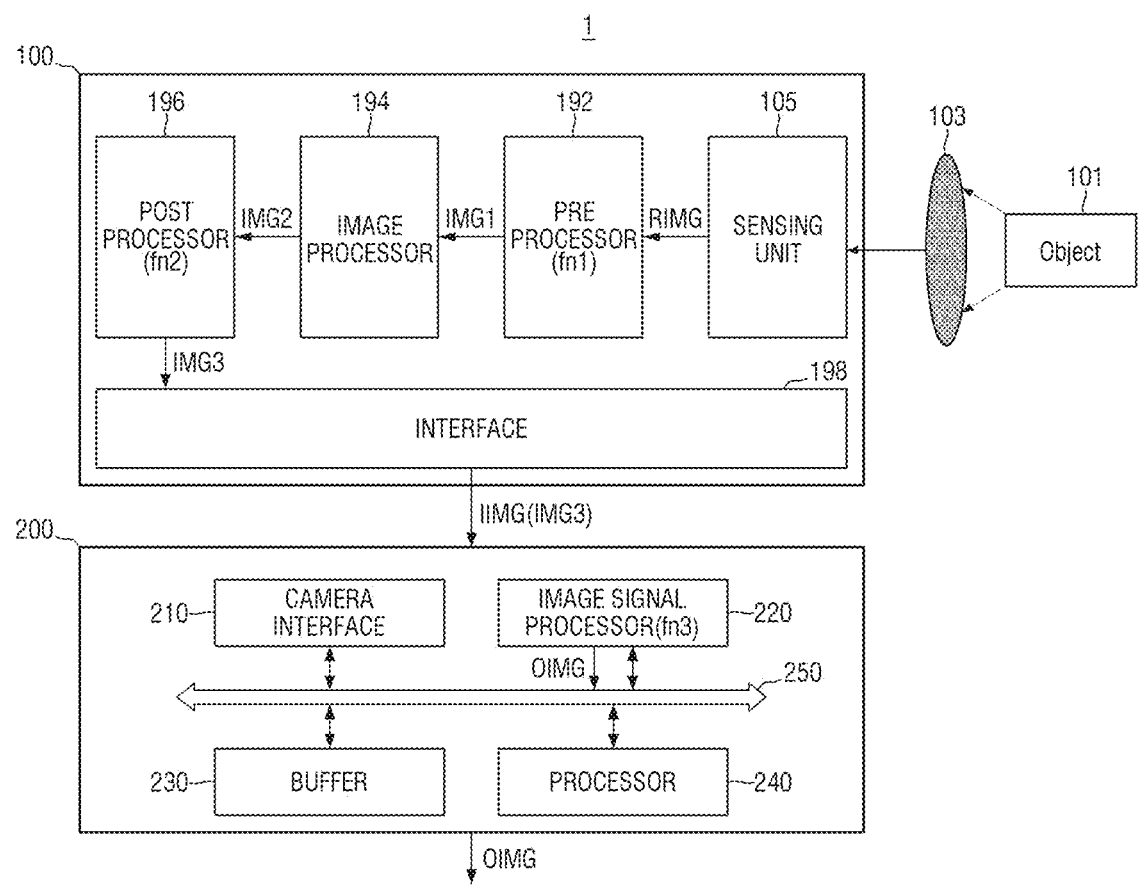
FIG. 1 is a diagram that illustrates an image processing system according to some embodiments.

FIG. 1 is a diagram that illustrates an image processing system according to some embodiments.

Referring to FIG. 1, an image processing system 1 according to some embodiments may include an image sensor 100 and an application processor 200. The image processing system 1 may be, or be implemented as a part of, a portable electronic device such as a digital camera, a camcorder, a mobile phone, a smartphone, a tablet personal computer (PC), a personal digital assistant (PDA), a mobile internet device (MID), a wearable computer, an Internet of things (IoT) device, or an Internet of everything (IoE) device.

The image sensor 100 may sense an object 101 photographed through a lens 103 under the control of the application processor 200. The image sensor 100 may convert an optical signal reflected from the object 101 and incident through the lens 103 into an electrical signal using a photo-sensing element (or photoelectric conversion device), generate image data based on the electrical signal, and output the generated image data.

The image sensor 100 may include a sensing unit 105, a pre-processing processor 192, an image processor 194, a post-processing processor 196, and an interface 198.

The sensing unit 105 may generate raw image data RIMG from a plurality of pixels PX.

The pre-processing processor 192 may receive the raw image data RIMG and output first image data IMG1. The pre-processing processor 192 may generate the first image data IMG1 by applying a first function fn1 to the raw image data RIMG from the plurality of pixels PX. In some embodiments, the first function fn1 may be a non-linear function.

The image processor 194 may receive the first image data IMG1 and output second image data IMG2. The image processor 194 may output the second image data IMG2 by performing one or more operations on the first image data IMG1.

In some embodiments, the image processor 194 may output the second image data IMG2 by performing a remosaic operation on the first image data IMG1. For example, the image processor 194 may convert the first image data IMG1 in a tetra format, a nona format, or a hexadeca format into the second image data IMG2 in the Bayer format.

Tetra format image data may be output from a pixel array 110 having a tetra pattern. An example pixel array 110 with the tetra pattern may have a pattern in which a red pixel group including red pixels is arranged 2×2, a first green pixel group including first green pixels is arranged 2×2, a second green pixel group including second green pixels is arranged 2×2, and in which a blue pixel group including blue pixels arranged is 2×2. The arrangement of the red pixel group, first green pixel group, second green pixel group, and the blue pixel group may be repeatedly disposed across the pixel array 110.

Nona format image data may be output from the pixel array 110 having a nona pattern. The pixel array 110 having the nona pattern may have a pattern in which a red pixel group including red pixels is arranged 3×3, a first green pixel group including first green pixels is arranged 3×3, a second green pixel group including second green pixels is arranged 3×3, and a blue pixel group including blue pixels arranged is 3×3. Similarly, this arrangement pattern may be repeatedly disposed across the pixel array 110.

Hexadeca format image data may be output from the pixel array 110 having a hexadeca pattern. The pixel array 110 having the hexadeca pattern may have a pattern in which a red pixel group including red pixels is arranged 4×4, a first green pixel group including first green pixels is arranged 4×4, a second green pixel group including second green pixels is arranged 4×4, and a blue pixel group including blue pixels is arranged 4×4. Similarly, this arrangement pattern may be repeatedly disposed across the pixel array 110.

Alternatively, the image processor 194 may convert image data output from the pixel array 110 having a pattern in which a red pixel group including red pixels is arranged N×M (N and M are natural numbers), a first green pixel group including green pixels is arranged N×M, a second green pixel group including green pixels is arranged N×M, and a blue pixel group including blue pixels is arranged N×M into Bayer format image data.

In some embodiments, the image processor 194 may receive the first image data IMG1 and generate the second image data IMG2 using machine learning. In such cases, the image processor 194 may perform the remosaic operation using the machine learning. For example, the image processor 194 may receive the first image data IMG1 and generate the second image data IMG2 with deep learning techniques using a neural network. The neural network may include at least one of various types of neural network models such as a convolution neural network (CNN), a region with convolutional neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a plain residual network, a dense network, a hierarchical pyramid network, a fully convolutional network, and the like.

The post-processing processor 196 may receive the second image data IMG2 and output third image data IMG3. The post-processing processor 196 may output the third image data IMG3 by applying a second function fn2 to the second image data IMG2. In some embodiments, the second function fn2 may be a non-linear function. The third image data IMG3 may be input to the application processor 200 through the interface 198.

In some embodiments, at least one of the pre-processing processor 192, the post-processing processor 196, and the image processor 194 may be implemented as hardware. For example, the pre-processing processor 192, the post-processing processor 196, and/or the image processor 194 may be implemented as dedicated hardware or may be implemented as a part of an existing general-purpose processor (e.g., CPU, GPU, etc.). For example, the pre-processing processor 192 and the post-processing processor 196 may be implemented as a central processing unit (CPU), a graphic processing unit (GPU), or the like, but the scope of the present disclosure is not limited thereto. The image processor 194 may be implemented as, for example, a neural processing unit (NPU), a graphic processing unit (GPU), or the like, but the scope of the present disclosure is not limited thereto.

In some embodiments, the pre-processing processor 192, the post-processing processor 196, and/or the image processor 194 may be implemented as software. In this case, the software may be stored on a computer-readable non-transitory computer readable medium. In addition, in this case, the software may be provided by an operating system (OS) or may be provided by a predetermined application. Alternatively, a part of the software may be provided by the operating system (OS), and the other part may be provided by the predetermined application.

The pre-processing processor 192 and the post-processing processor 196 are illustrated as separate components, but this is only one example, and they may be implemented as a single component.

The interface 198 may support data movement between the image sensor 100 and the application processor 200. The interface 198 may communicate with the application processor 200 according to one of various interface methods such as a mobile industry processor interface (MIPI), an embedded display port (eDP) interface, a universal asynchronous receiver transmitter (UART) interface, an inter integrated circuit (I2C) interface, a serial peripheral interface (SPI), and the like.

The application processor 200 may include a camera interface 210, an image signal processor 220, a buffer 230, and a processor 240.

The application processor 200 may receive the third image data IMG3 as input image data IIMG through the camera interface 210. The camera interface 210 may support data movement between the image sensor 100 and the application processor 200.

The image signal processor 220 may process the input image data IIMG provided from the image sensor 100 and output an output image data OIMG. The image signal processor 220 may output the output image data OIMG by performing one or more operations on the input image data IIMG. For example, the one or more operations may include cross-talk compensation, bad pixel correction, merging or reconstruction of multiple exposure pixels, demosaicing, noise reduction, image sharpening, image stabilization, color space conversion, compression, or the like, but the scope of the present disclosure is not limited thereto.

In some embodiments, the image signal processor 220 may generate the output image data OIMG by applying a third function fn3 to the input image data IIMG. The third function fn3 may be a non-linear function. For example, the image signal processor 220 may perform gamma correction by applying the third function fn3.

For example, the image signal processor 220 may be implemented as at least one piece of hardware. For example, the image signal processor 220 may be implemented as at least one piece of dedicated hardware, or may be implemented as a part of any processor that is configured to perform image processing, such as a graphic processing unit (GPU), a digital signal processor (DSP), an image signal processor (ISP), and the like. For example, the image signal processor 220 may be implemented as software.

The buffer 230 may provide a memory configured to temporarily store data. For example, the image signal processor 220 may temporarily store the image data in the buffer 230. In addition, a program to be executed by the processor 240 may be loaded in the buffer 230, and data used by the program may be stored in the buffer 230.

The buffer 230 may be implemented as, for example, a static random access memory (SRAM), a dynamic random access memory (DRAM), or the like, but the scope of the present disclosure is not limited thereto, and the buffer 230 may be implemented as or include a non-volatile memory in some embodiments.

The processor 240 may generally control the application processor 200. For example, the processor 240 may execute a program including instructions for operating various elements of the application processor 200 as well as the image signal processor 220.

The processor 240 may be implemented as, for example, a central processing unit (CPU), a graphic processing unit (GPU), or the like, but the scope of the present disclosure is not limited thereto.

An internal bus 250 may serve as a passage that allows the elements in the application processor 200 such as the camera interface 210, the image signal processor 220, the buffer 230, the processor 240, and the like to exchange data with each other. For example, the internal bus 250 may be implemented as an advanced extensible interface (AXI) conforming to, for example, advanced microcontroller bus architecture (AMBA), but the scope of the present disclosure is not limited thereto.

Figure 2:
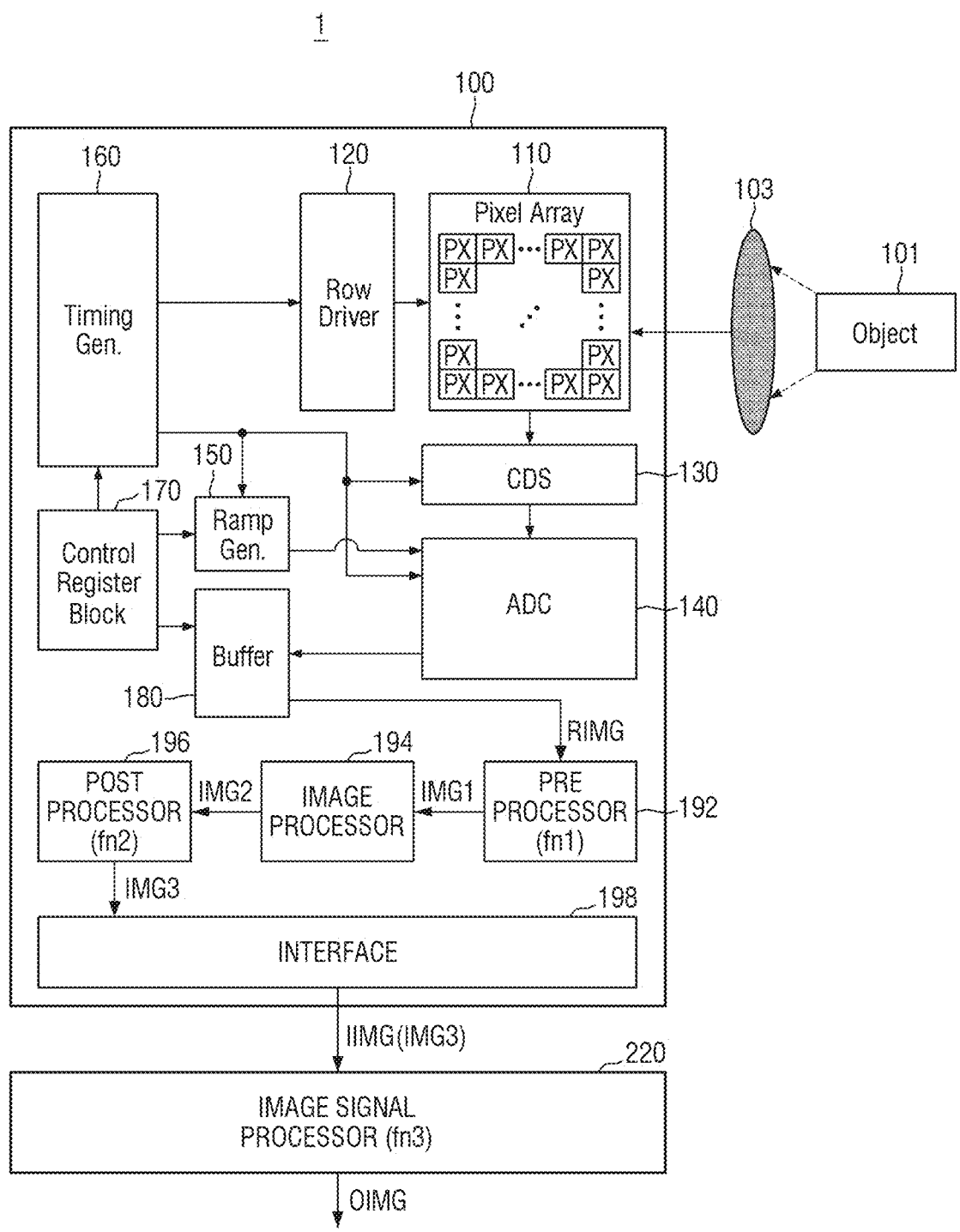
FIG. 2 is a diagram that illustrates an image sensor according to some embodiments.

FIG. 2 is a diagram that illustrates an image sensor according to some embodiments.

Referring to FIG. 2, the image sensor 100 may include a pixel array 110, a row driver 120, a correlated double sampling (CDS) block 130, an analog-to-digital converter (ADC) block 140, a ramp signal generator 150, a timing generator 160, a control register block 170, a buffer 180, a pre-processing processor 192, an image processor 194, a post-processing processor 196, and an interface 198. The sensing unit 105 of FIG. 1 may include the pixel array 110, the row driver 120, the CDS block 130, the ADC block 140, the ramp signal generator 150, and the timing generator 160, the control register block 170, and the buffer 180 in FIG. 2.

The pixel array 110 may include a plurality of pixels arranged in a matrix form. Each of the plurality of pixels may sense light using a photo-sensing element and convert the sensed light into a pixel signal, e.g., an electrical signal. For example, the photo-sensing element may be a photo diode, a photo transistor, a photo gate, a pinned photo diode (PPD), or a combination thereof. Each of the plurality of photo-sensing elements of the pixels may have a four-transistor structure which includes a photo diode, a transfer transistor, a reset transistor, an amplifying transistor, and a selection transistor. According to some embodiments, each of the plurality of photo-sensing elements may have a one-transistor structure, a three-transistor structure, or a five-transistor structure, or a structure in which the plurality of pixels share some transistors.

Raw image data RIMG may be output from the pixel array 110 through the CDS block 130, the ADC block 140, and the buffer 180.

The row driver 120 may activate each of the plurality of pixels under the control of the timing generator 160. For example, the row driver 120 may drive pixels implemented in the pixel array 110 in units of rows. For example, the row driver 120 may generate control signals capable of controlling the operation of the plurality of pixels included in each of the plurality of rows of the pixels.

According to the control signals, the pixel signal output from each of the plurality of pixels is transmitted to the CDS block 130.

The CDS block 130 may include a plurality of CDS circuits. Each of the plurality of CDS circuits, in response to at least one switch signal output from the timing generator 160, may perform correlated double sampling on pixel values output from each of a plurality of column lines implemented in the pixel array 110 and may compare the correlated double-sampled pixel value and the ramp signal output from the ramp signal generator 150 with each other to output a plurality of comparison signals.

The ADC block 140 may convert each of the plurality of comparison signals output from the CDS block 130 into a digital signal or a plurality of digital signals and output the plurality of digital signals to the buffer 180.

The timing generator 160 may generate a signal that provides a reference for an operation timing of various components of the image sensor 100. The operation timing reference signal generated by the timing generator 160 may be transmitted to the row driver 120, the CDS block 130, the ADC block 140, and the ramp signal generator 150.

The control register block 170 may control the overall operation of the image sensor 100. The control register block 170 may control operations of the ramp signal generator 150, the timing generator 160, and the buffer 180.

The buffer 180 may output the raw image data RIMG corresponding to the plurality of digital signals output from the ADC block 140.

Figure 3:
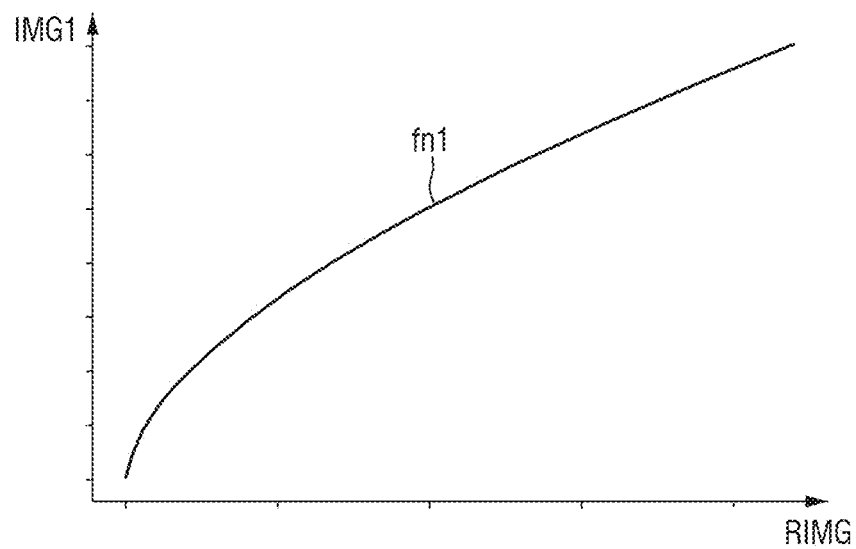
FIG. 3 is a diagram that illustrates a first function of FIG. 1.
Figure 4:
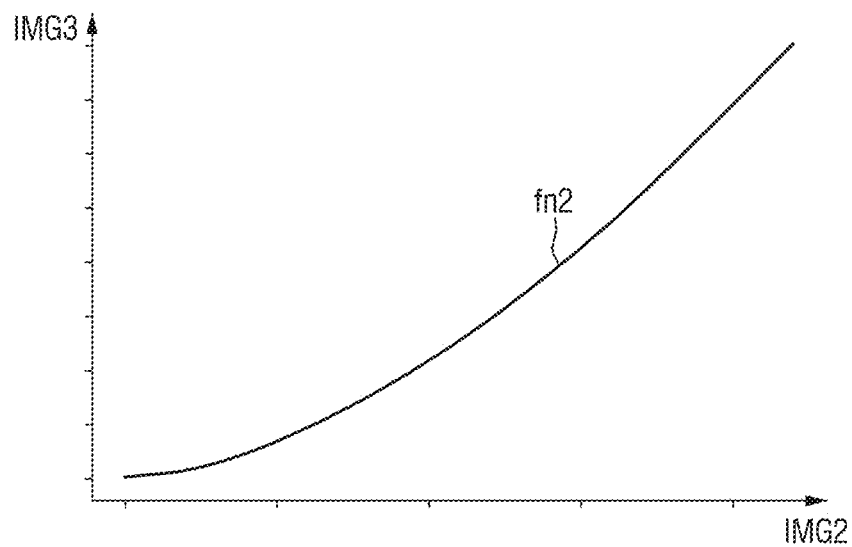
FIG. 4 is a diagram that illustrates a second function of FIG. 1.
Figure 5:
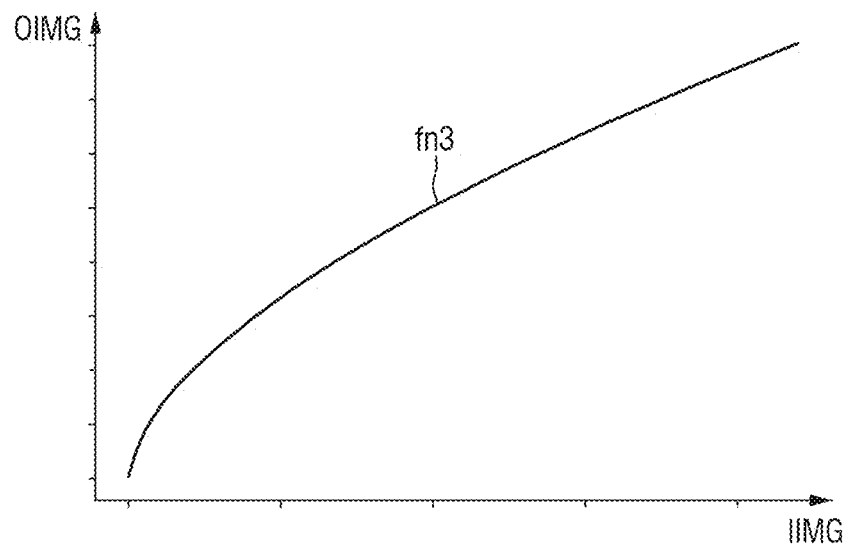
FIG. 5 is a diagram that illustrates a third function of FIG. 1.

FIG. 3 is a diagram that illustrates the first function of FIG. 1. FIG. 4 is a diagram that illustrates the second function of FIG. 1. FIG. 5 is a diagram that illustrates the third function of FIG. 1.

Referring to FIGS. 1 and 3, the first function fn1 may be a non-linear function. The first function fn1 may perform a transformation on the raw image data RIMG to form the first image data IMG1. An X-axis may represent a luminance of the raw image data RIMG, and a Y-axis may represent a luminance of the first image data IMG1. A low luminance component of the raw image data RIMG may be amplified, and a high luminance component of the raw image data RIMG may be reduced. For example, a low range of luminance values, such as a luminance range from 0 to 30 on a scale of 0 to 255, may be multiplied by a number greater than one, or added to, in order to amplify the low range of luminance values. The multiplication factor or the addition factor may be changed along the low range of luminance when the first function fn1 is a non-linear function. In one example, the high range may be a luminance range of 225-255, and luminance values therein may be multiplied by a number less than one, or subtracted from, in order to reduce the high range of luminance values. The multiplication factor or the addition factor may be changed along the high range of luminance when the first function fn1 is a non-linear function. A luminance range in between the low range and the high range might not be substantially changed by the first function fn1 according to some embodiments. While the particular low and high luminance ranges have been provided as an example, the present disclosure encompasses other ranges.

The first function fn1 may be the same as the third function fn3.

Referring to FIGS. 1 and 4, the second function fn2 may be a non-linear function. The second function fn2 may perform a transformation on the second image data IIMG2 to form the third image data IMG3. An X-axis may represent a luminance of the second image data IIMG2, and a Y-axis may represent a luminance of the third image data IMG3. A low luminance component of the second image data IIMG2 may be reduced, and a high luminance component of the second image data IIMG2 may be amplified.

The second function fn2 may be different from the first function fn1. The second function fn2 may be an inverse function of the first function fn1.

Referring to FIGS. 1 and 5, the third function fn3 may be a non-linear function. The third function fn3 may perform a transformation on the input image data IIMG to form the output image data OIMG. An X-axis may represent a luminance of the input image data IIMG, and a Y-axis may represent a luminance of the output image data OIMG. Gamma correction may be performed using the third function fn3. A low luminance component of the input image data IIMG may be amplified, and a high luminance component of the input image data IIMG may be reduced. Accordingly, a noise component of the low luminance component of the input image data IIMG may also be amplified.

FIGS. 6 to 10 are diagrams that illustrate an operation of an image sensor according to some embodiments.

Figure 6:
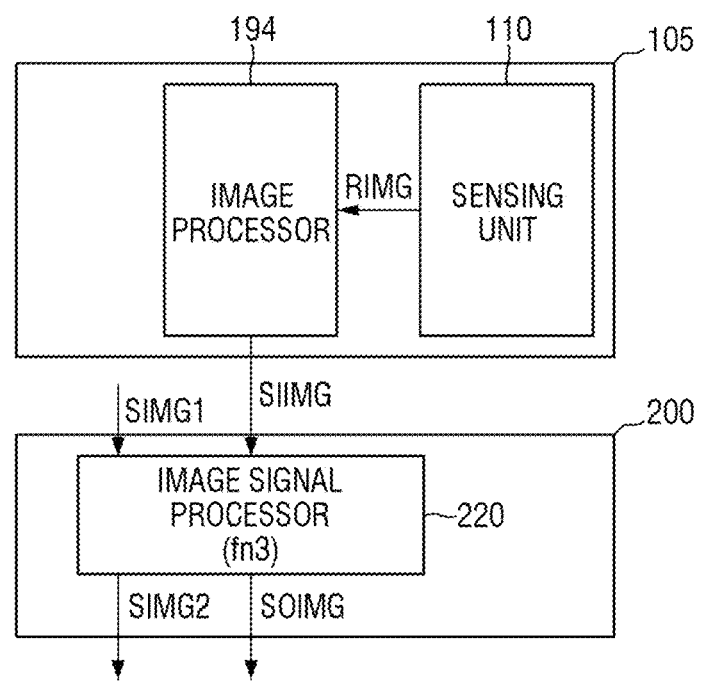
FIGS. 6 to 10 are diagrams that illustrate an operation of an image sensor according to some embodiments.

FIG. 6 illustrates an embodiment in which the pre-processing processor 192 and the post-processing processor 196 of FIG. 1 are not present.

The image processor 194 may receive the raw image data RIMG generated from the sensing unit 105 and output sample input image data SIIMG using machine learning. For example, the image processor 194 may execute instructions that implement a model which was trained using machine learning. The image signal processor 220 may output sample output image data SOIMG by applying the third function fn3 to the sample input image data SIIMG.

The image signal processor 220 may output second sample image data SIMG2 by applying the third function fn3 to the first sample image data SIMG1 that has not been passed through the image processor 194. For example, the first sample image data SIMG1 is image data on which the machine learning is not performed.

Figure 7:
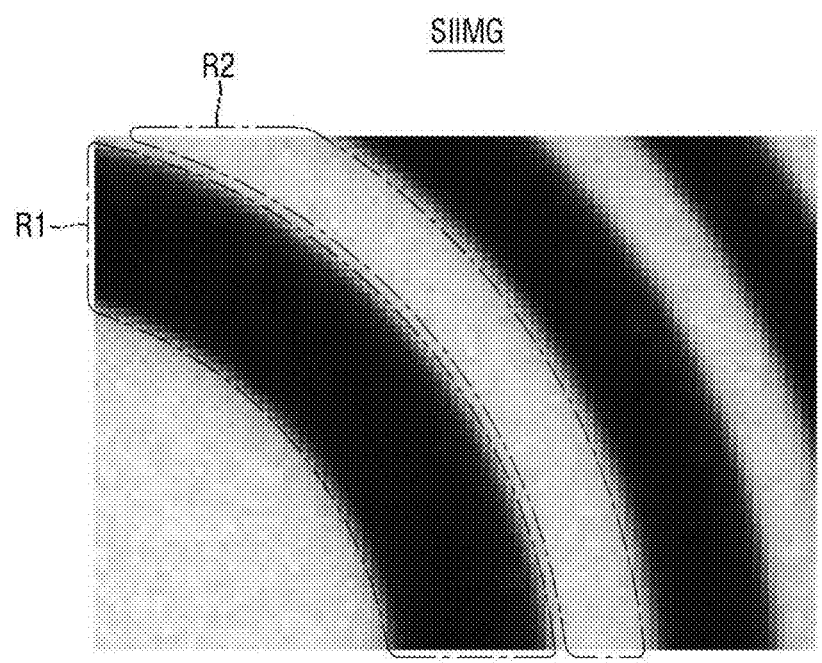

A trained deep learning model outputs output image data having the same or similar error with respect to the entire luminance range (e.g., 0 level to 255 level) of image data input to the deep learning model. Referring to FIG. 7, the sample input image data SIIMG output by the image processor 194 using the trained deep learning model has similar errors in a dark region R1 and a bright region R2. The error(s) may refer to reproduction artifacts and/or noise.

Figure 8:
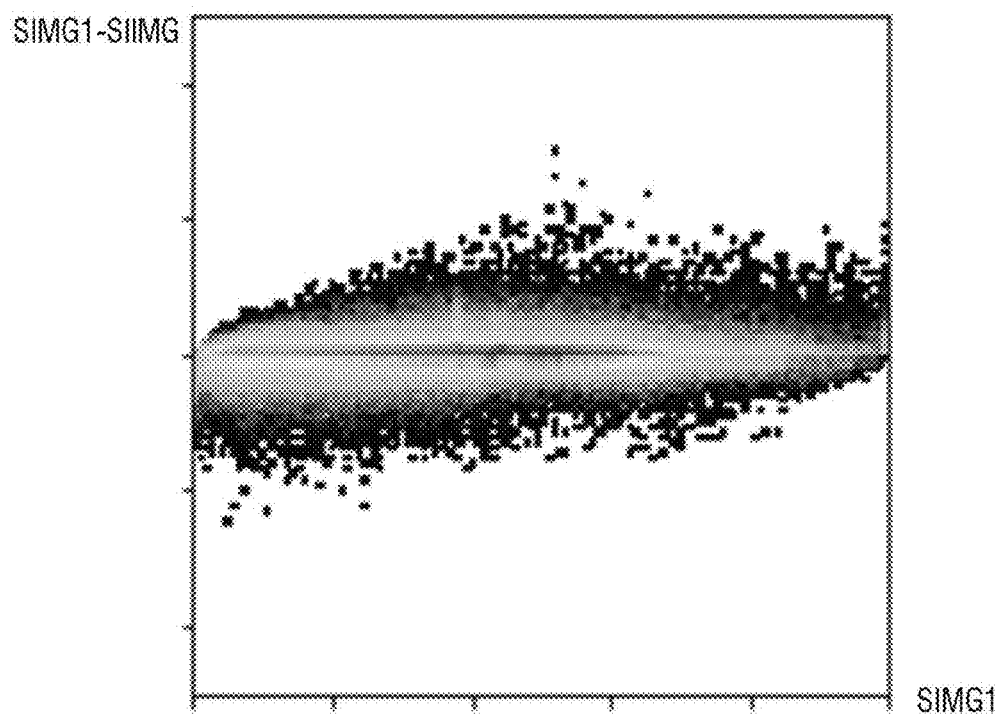

Referring to FIG. 8, an X-axis may represent a luminance of the first sample image data SIMG1, and a Y-axis may represent a difference between the luminance of the first sample image data SIMG1 and a luminance of the sample input image data SIIMG. The difference between the luminance of the first sample image data SIMG1 and the luminance of the sample input image data SIIMG may be the same or similar according to the luminance of the first sample image data SIMG1.

Figure 9:
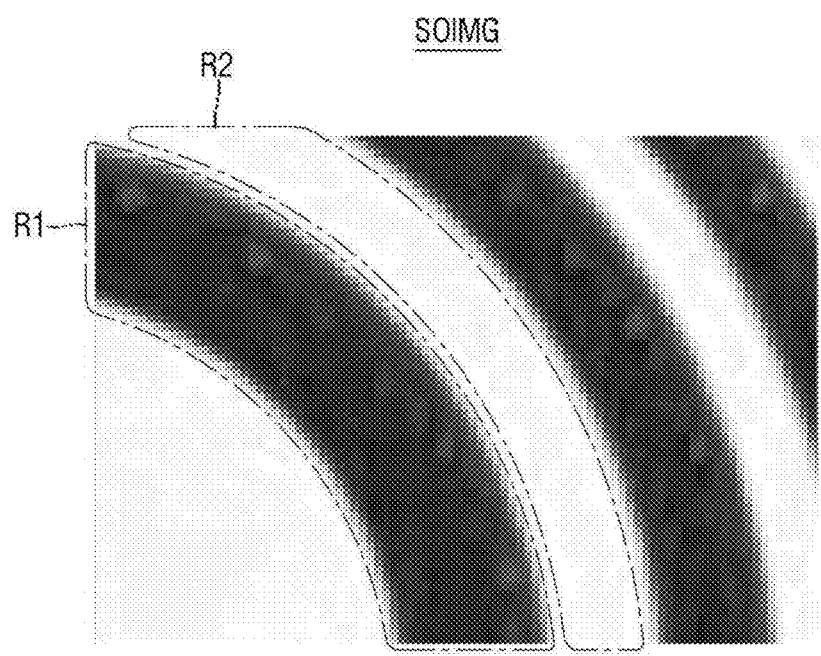

Referring to FIG. 9, the sample output image data SOIMG generated by applying the third function fn3 to the sample input image data SIIMG by the image signal processor 220 has a relatively large error in the dark region R1 and a relatively small error in the bright region R2. Referring to FIG. 5, this can occur when a high luminance component of the sample input image data SIIMG is reduced, while a low luminance component of the sample input image data SIIMG is amplified, and accordingly, the noise component of the low luminance component is also expanded.

Figure 10:
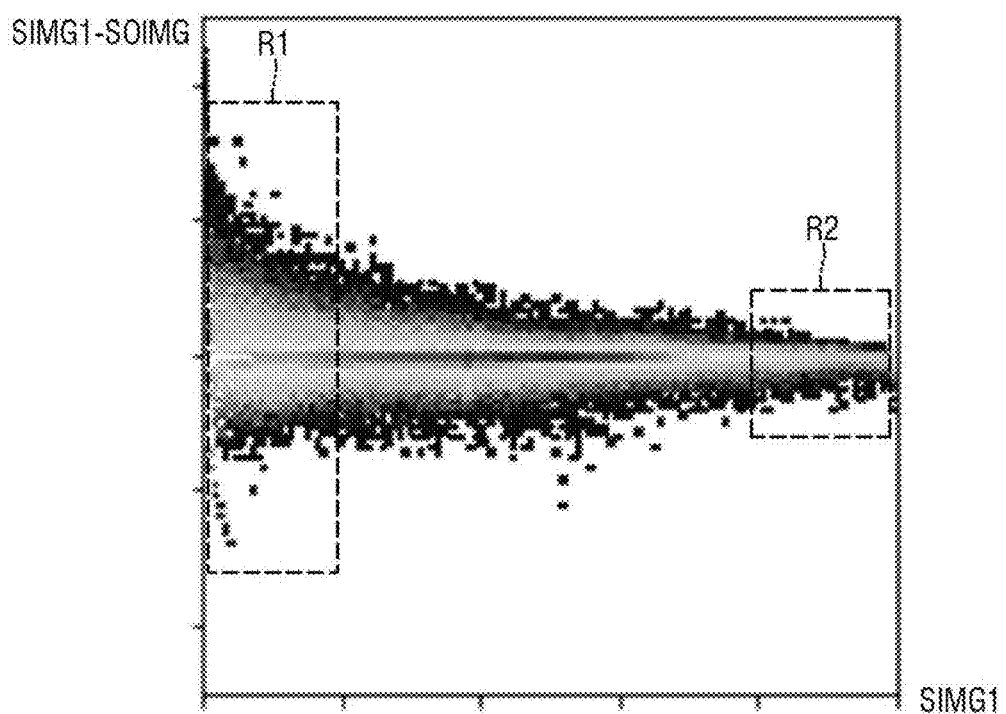

Referring to FIG. 10, an X-axis may represent the luminance of the first sample image data SIMG1, and a Y-axis may represent a difference between a luminance of the second sample image data SIMG2 and a luminance of the sample output image data SOIMG. The difference between the luminance of the second sample image data SIMG2 and the luminance of the sample output image data SOIMG may increase toward the dark region R1 (low luminance region, e.g., shown by the left side of the graph) of the first sample image data SIMG1 and may decrease toward the bright region R2 (high luminance region, e.g., shown by the right side of the graph) of the first sample image data SIMG1.

However, referring to FIG. 1, the image sensor 100 according to some embodiments may include the pre-processing processor 192, which applies the first function at a front end of the image processor 194, and the post-processing processor 196, which applies the second function at a rear end of the image processor 194.

The image processor 194 may output the second image data IMG2 having the same or similar error (e.g., artifacts, noise) with respect to the entire luminance range by using the deep learning model for the first image data IMG1 to which the first function fn1 is applied. The post-processing processor 196 may generate the third image data IMG3 by applying the second function fn2 to the second image data IMG2. According to the second function fn2, an error may decrease toward a low luminance region of the third image data IMG3 and may increase toward a high luminance region of the third image data IMG3. For example, according to the second function fn2, the low luminance region of the third image data IMG3 may be reduced, and the high luminance region of the third image data IMG3 may be amplified. The image signal processor 220 may generate the output image data OIMG by applying the third function fn3 to the third image data IMG3. According to the third function fn3, an error may increase toward a low luminance region of the output image data OIMG and may decrease toward a high luminance region of the output image data OIMG. Therefore, in an image processed by the image processing system according to the present disclosure, error may be uniform or similar across the luminance range of the output image data OIMG. In this case, since the first function fn1 and the second function fn2 have an inverse function relationship, there is no change in image data by the pre-processing processor 192 and the post-processing processor 196.

Training the deep learning model of the image processor 194 so as to perform functions of the pre-processing processor 192 and the post-processing processor 196 may include a training time, and may increase a processing speed of the deep learning model.

However, since the image processing system according to some embodiments uses the existing trained deep learning model of the image processor 194, it is possible to output the output image data OIMG having a uniform or similar error according to the luminance without additional training of the deep learning model. Therefore, the training time of the deep learning model is unnecessary, and the processing speed of the deep learning model of the image processor 194 does not increase. Accordingly, the image processing system 1 according to some embodiments may output the output image data OIMG with increased quality.

Figure 11:
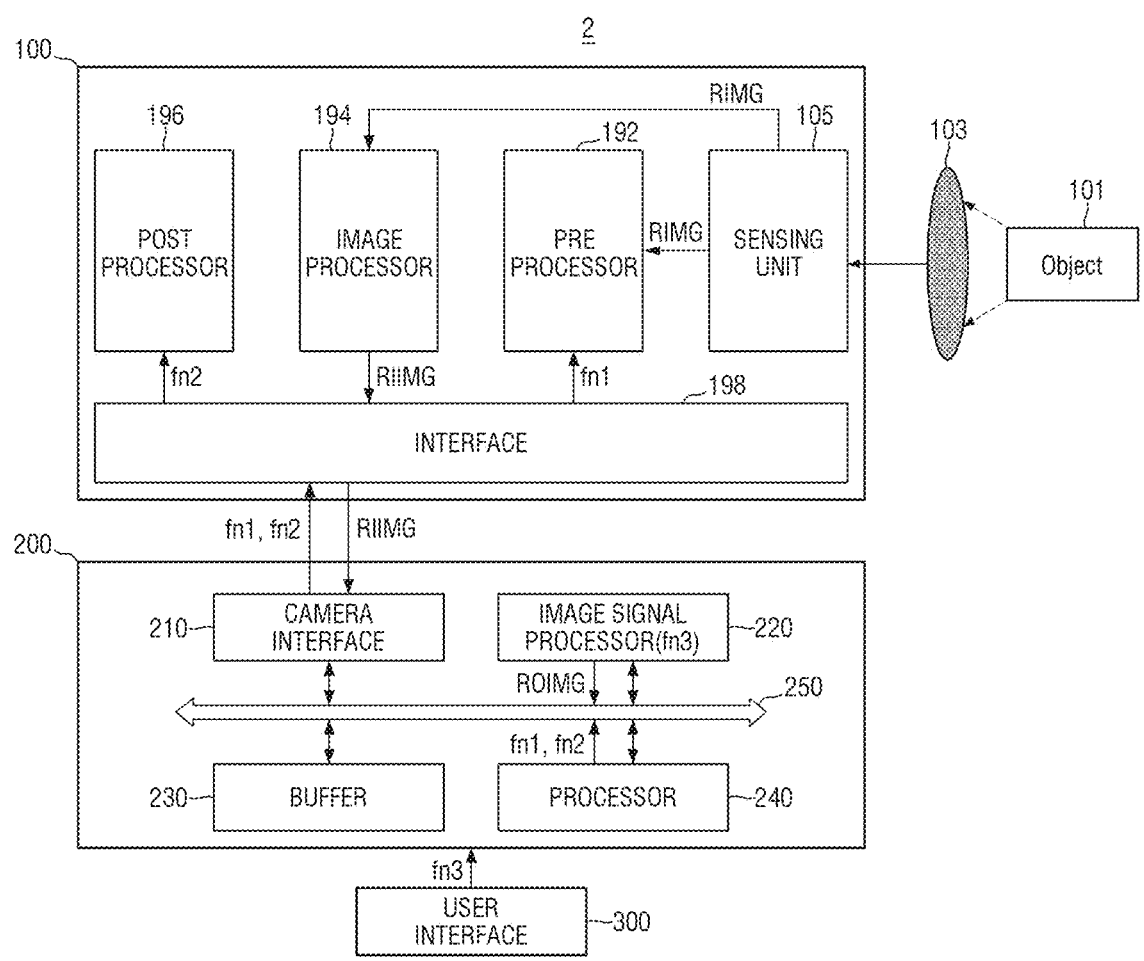
FIG. 11 is a diagram that illustrates an operation of an image processing system according to some embodiments.

FIG. 11 is a diagram that illustrates an operation of an image processing system according to some embodiments.

Referring to FIG. 11, in an image processing system 2 according to some embodiments, a user interface 300 may receive a user input and provide a signal corresponding to the received user input to the application processor 200.

The user interface 300 may be implemented with various devices capable of receiving the user input, such as a keyboard, a curtain key panel, a touch panel, a fingerprint sensor, a microphone, and the like.

In some embodiments, the third function fn3 performed by the image signal processor 220 may be received through the user interface 300. Accordingly, the image signal processor 220 may process (e.g., gamma correction) image data using the third function fn3. In some embodiments, the third function fn3 may be user configurable.

In some embodiments, the processor 240 may calculate the first function fn1 and the second function fn2 in response to the input of the third function fn3.

For example, the pre-processing processor 192 and the post-processing processor 196 of the image sensor 100 may be disabled. For example, in the image sensor 100, the pre-processing processor 192 and the post-processing processor 196 may be enabled or disabled according to a control signal. The control signal may be provided from the user interface 300 or from the processor 240.

The image sensor 100 may output raw input image data RIIMG according to the control signal. For example, the image processor 194 may receive the raw image data RIMG and generate the raw input image data RIIMG using a model trained by machine learning. The image signal processor 220 may receive the raw input image data RIIMG through the interface 198 and the camera interface 210 and output raw output image data ROIMG. The image signal processor 220 may output the raw output image data ROIMG by applying the third function fn3 to the raw input image data RIIMG.

The processor 240 may receive the raw input image data RIIMG and the raw output image data ROIMG. The processor 240 may calculate the third function fn3 from the raw input image data RIIMG and the raw output image data ROIMG.

The processor 240 may calculate the first function fn1 and the second function fn2 from the third function fn3. The processor 240 may calculate the third function fn3 as the first function fn1 and calculate the inverse function of the third function fn3 as the second function fn2.

The processor 240 may provide the first function fn1 to the pre-processing processor 192 and provide the second function fn2 to the post-processing processor 196. Accordingly, the pre-processing processor 192 may process the image data using the first function fn1, and the post-processing processor 196 may process the image data using the second function fn2. Therefore, even when the third function fn3 of the image signal processor 220 is changed, the image processing system 2 may change only the first function fn1 and the second function fn2.

Figure 12:
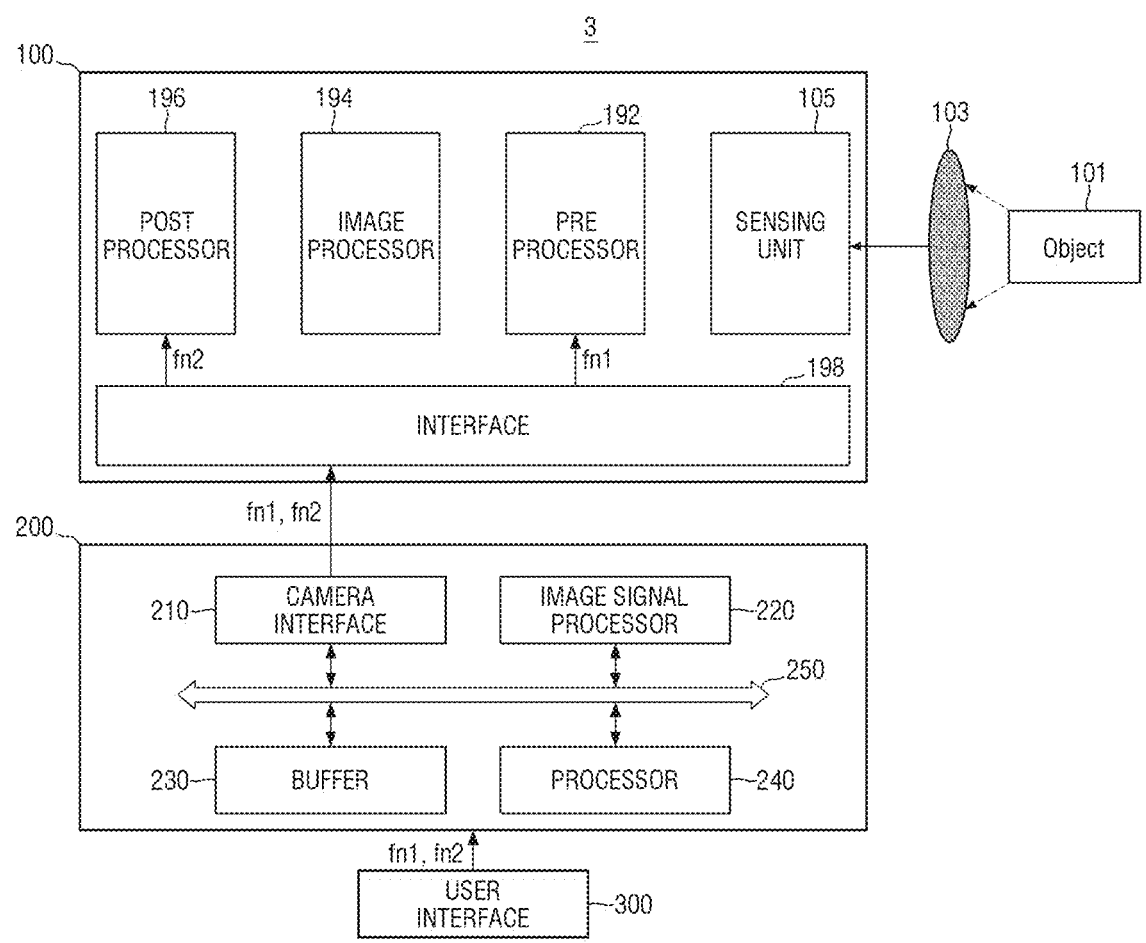
FIG. 12 is a diagram that illustrates an operation of an image processing system according to some embodiments.

FIG. 12 is a diagram that illustrates an operation of an image processing system according to some embodiments. For convenience of description, points different from those described in FIG. 11 will be mainly described.

Referring to FIG. 12, in an image processing system 3 according to some embodiments, the first function fn1 and the second function fn2 may be provided from outside the image processing system 3.

For example, the first function fn1 to be performed by the pre-processing processor 192 may be received through the user interface 300. The second function fn2 to be performed by the post-processing processor 196 may be received through the user interface 300. Accordingly, the pre-processing processor 192 may process the image data using the first function fn1, and the post-processing processor 196 may process the image data using the second function fn2.

For example, an external processor connected to the user interface 300 may receive the raw input image data RIIMG and the raw output image data ROIMG. The external processor may calculate the first function fn1 and the second functions fn2 using the raw input image data RIMG and the raw output image data ROIMG and provide the first function fn1 and the second functions fn2 to the image sensor 100.

Figure 13:
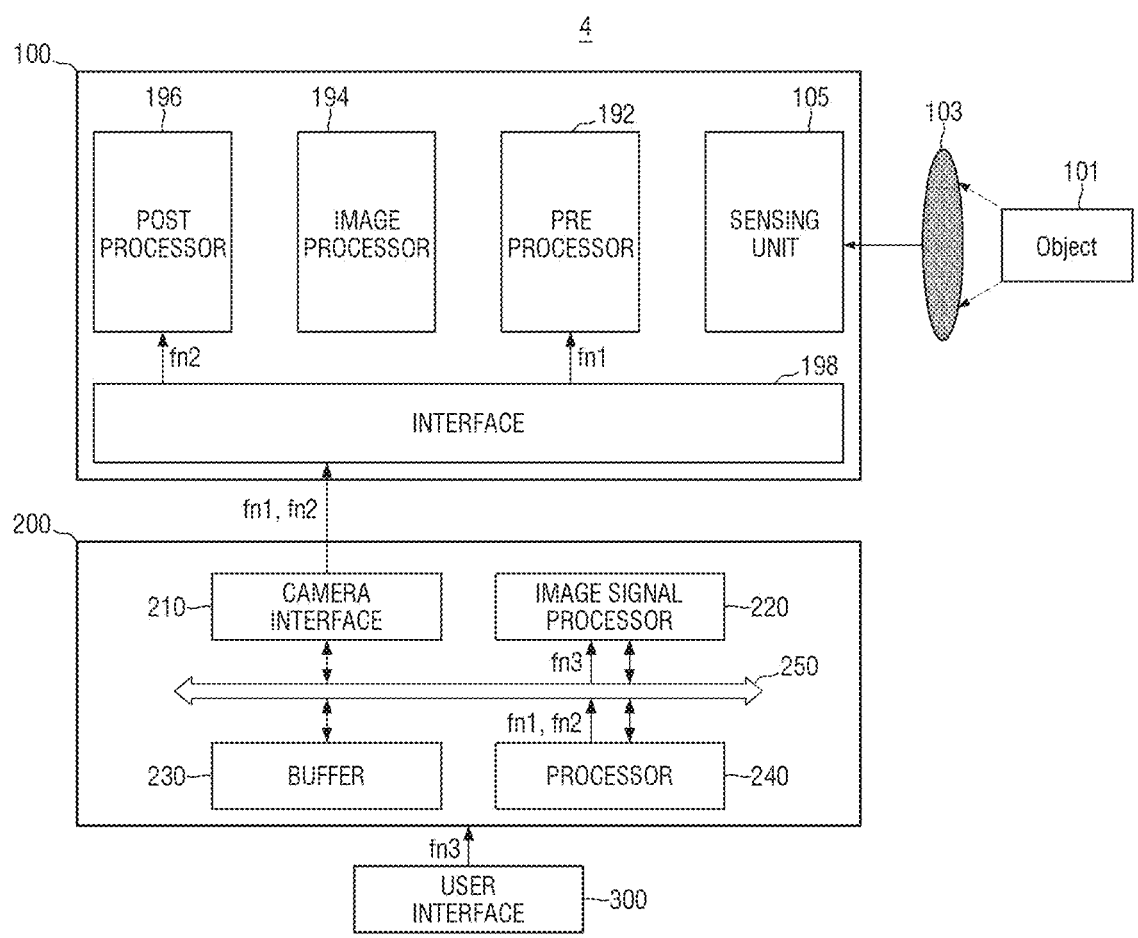
FIG. 13 is a diagram that illustrates an operation of an image processing system according to some embodiments.

FIG. 13 is a diagram that illustrates an operation of an image processing system according to some embodiments. For convenience of description, points different from those described in FIG. 11 will be mainly described.

Referring to FIG. 13, in an image processing system 4 according to some embodiments, the processor 240 may calculate the first function fn1 and the second function fn2 in response to receiving the third function fn3. The processor 240 may calculate the first function fn1 and the second function fn2 based on the third function fn3. For example, the processor 240 may calculate the third function fn3 as the first function fn1 and the inverse function of the third function fn3 as the second function fn2.

The processor 240 may provide the first function fn1 to the pre-processing processor 192 and provide the second function fn2 to the post-processing processor 196. Accordingly, the pre-processing processor 192 may process the image data using the first function fn1, and the post-processing processor 196 may process the image data using the second function fn2.

Figure 14:
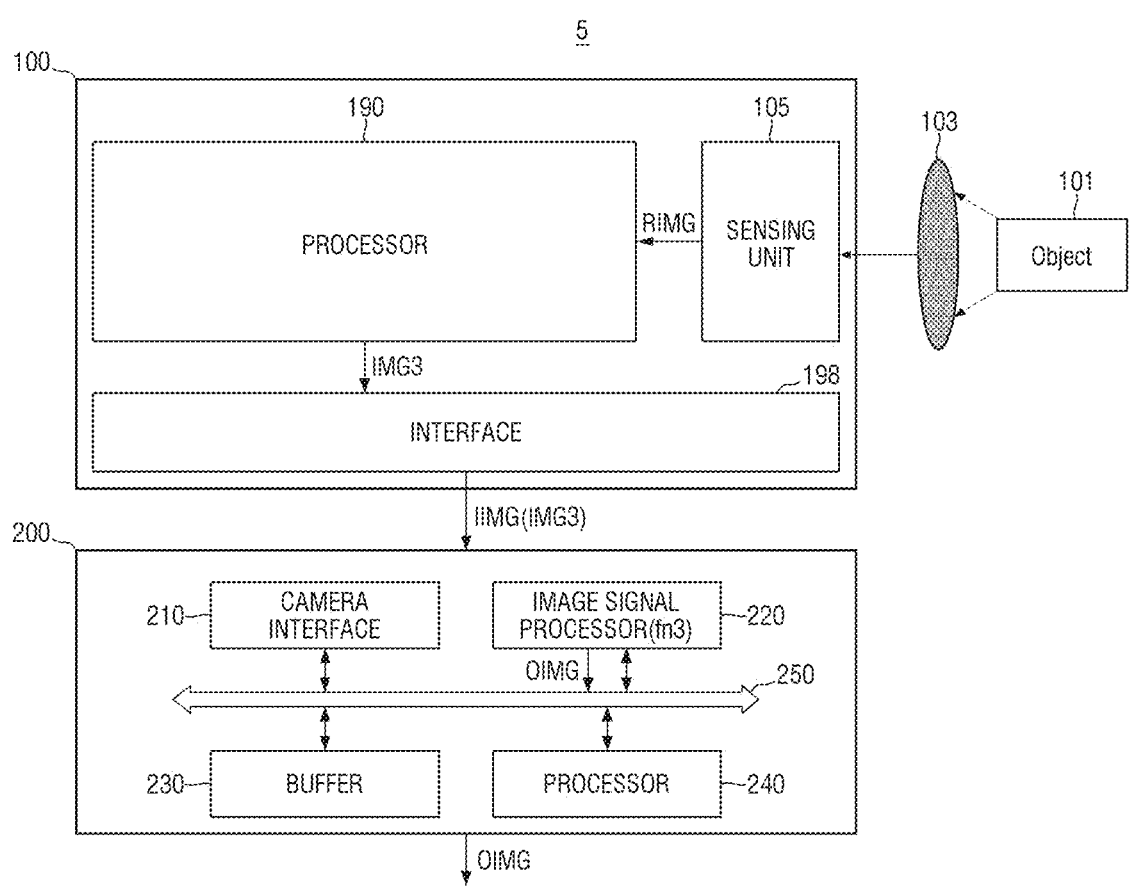
FIG. 14 is a diagram that illustrates an image processing system according to some embodiments.

FIG. 14 is a diagram that illustrates an image processing system according to some embodiments. For convenience of description, the description will be focused on points different from those described with reference to FIG. 1.

Referring to FIG. 14, an image processing system 5 according to some embodiments may include an image sensor 100 and an application processor 200. The image sensor 100 may include a sensing unit 105, a processor 190, and an interface 198.

The processor 190 may receive the raw image data RIMG from the sensing unit 105 and output the third image data IMG3. The third image data IMG3 may be input to the application processor 200 through the interface 198.

For example, referring to FIG. 3, the processor 190 may generate the first image data IMG1 by applying the first function fn1 to the raw image data RIMG provided from the sensing unit 105. The first function fn1 may be a non-linear function. The processor 190 may perform one or more operations on the first image data IMG1 to generate the second image data IMG2. In some embodiments, the processor 190 may perform a remosaic operation on the first image data IMG1 to generate the second image data IMG2. For example, the processor 190 may receive the first image data IMG1 and generate the second image data IMG2 using deep learning using a neural network. Referring to FIG. 4, the processor 190 may generate and output the third image data IMG3 by applying the second function fn2 to the second image data IMG2. For example, the second function fn2 may be a non-linear function. Accordingly, in this embodiment, the pre-processing processor 192, the image processor 194, and the post-processing processor 196 of FIG. 1 may be implemented as one processor 190. In some embodiments, the processor 190 may be implemented as dedicated hardware or may be implemented as a part of an existing general-purpose processor (e.g., CPU, GPU, etc.). In some embodiments, the processor 190 may be implemented as a central processing unit (CPU), a graphic processing unit (GPU), a neural processing unit (NPU), a graphic processing unit (GPU), or the like, but the scope of the present disclosure is limited thereto.

Figure 15:
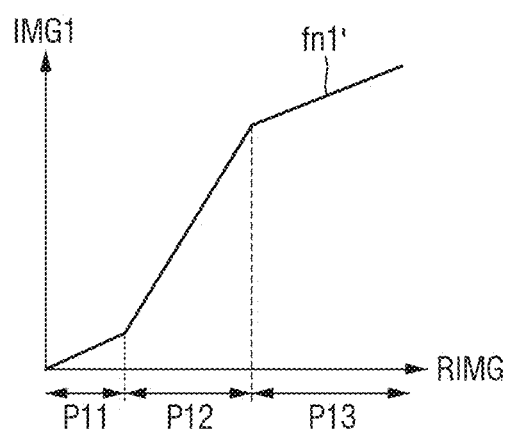
FIG. 15 is a diagram that illustrates a first function according to some embodiments.

FIG. 15 is a diagram that illustrates a first function according to some embodiments. A first function fn1' of FIG. 15 corresponds to the first function fn1 of FIGS. 1 to 14.

Referring to FIG. 15, the first function fn1' according to some embodiments may be a piecewise linear function. In at least one section among a plurality of sections P11, P12, and P13 of the first function fn1', the first function fn1' is a linear function, but the first function fn1' might not be a linear function in all of the sections P11, P12, and P13 of the first function fn1'. For example, a slope of the first function fn1' in the first section P11 may be different from at least one of slopes of the first function fn1' in the second section P12 and the first function fn1' in the third section P13. In some embodiments, one or more of the sections P11, P12, and/or P13 may be curved, and may include exponential portions. In some embodiments, the first section P11 corresponds to the low luminance component, the second section P12 corresponds to a middle (i.e., neither low nor high) luminance component, and the third section P13 corresponds to the high luminance component.

The second function fn2 of FIGS. 1 to 14 may be an inverse function of the first function fn1' of FIG. 15, and the third function fn3 of FIGS. 1 to 14 may be the same as the first function fn1' of FIG. 15.

In some embodiments, the pre-processing processor 192 may divide the raw image data RIMG into a plurality of sections and apply the first function fn1' to each section to generate the first image data IMG1. The post-processing processor 196 may divide the second image data IMG2 into a plurality of sections and apply the second function fn2' to each section to output the third image data IMG3. For example, the pre-processing processor 192 may generate the first image data IMG1 by applying the first function fn1' across the entire luminance range of the raw image data RIMG. Since the first function fn1' has a domain across the entire luminance range of the data, and includes first through third sections P11 to P13, each of the first through third sections P11 to P13 may be applied to a corresponding luminance range of the raw image data RIMG. For example, the first section P11 of the first function fn1' may be applied to the first section P11 of the raw image data RIMG, the second section P12 of the first function fn1' may be applied to the second section P12 of the raw image data RIMG, and the third section P13 of the first function fn1' may be applied to the third section P13 of the raw image data RIMG to generate the first image data IMG1. Similarly, the post-processing processor 196 may apply the second function fn2', which is an inverse function of the first function fn1', across the first through third sections of the second image data IMG2 to generate the third image data IMG3.

Figure 16:
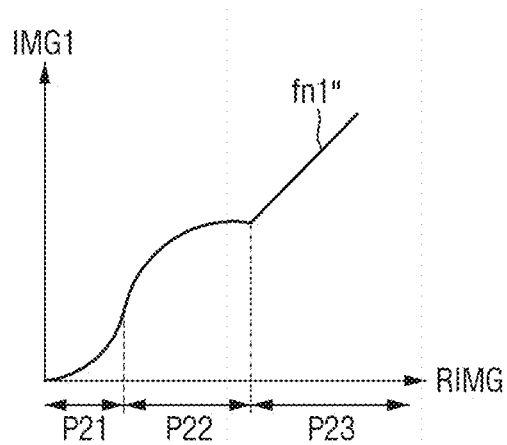
FIG. 16 is a diagram that illustrates a first function according to some embodiments.

FIG. 16 is a diagram that illustrates a first function according to some embodiments. A first function fn1" of FIG. 16 corresponds to the first function fn1 of FIGS. 1 to 14.

Referring to FIG. 16, the first function fn1" according to some embodiments may be a piecewise dictionary function. A plurality of sections P21, P22, and P23 of the first function fn1" have different functions, and the first function fn1" may not be a linear function in any of the sections P21, P22, and P23 of the first function fn1". For example, the first function fn1" in the first section P21 may be different from the first function fn1" in the second section P and the first function fn1" in the third section P23.

The second function fn2 of FIGS. 1 to 14 may be an inverse function of the first function fn1" of FIG. 16, and the third function fn3 of FIGS. 1 to 14 may be the same as the first function fn1 of FIG. 16.

In some embodiments, the pre-processing processor 192 may divide the raw image data RIMG into a plurality of sections and apply the first function fn1" to each section to generate the first image data IMG1. The post-processing processor 196 may divide the second image data IMG2 into a plurality of sections and apply the second function fn2 to each section to output the third image data IMG3. For example, the pre-processing processor 192 may generate the first image data IMG1 by applying the first section P21 of the first function fn1" to the first section P21 of the raw image data RIMG. The post-processing processor 196 may output the third image data IMG3 by applying the first section P21 of the second function fn2 that is an inverse function of the first function fn1" to the first section P21 of the second image data IMG2.

Figure 17:
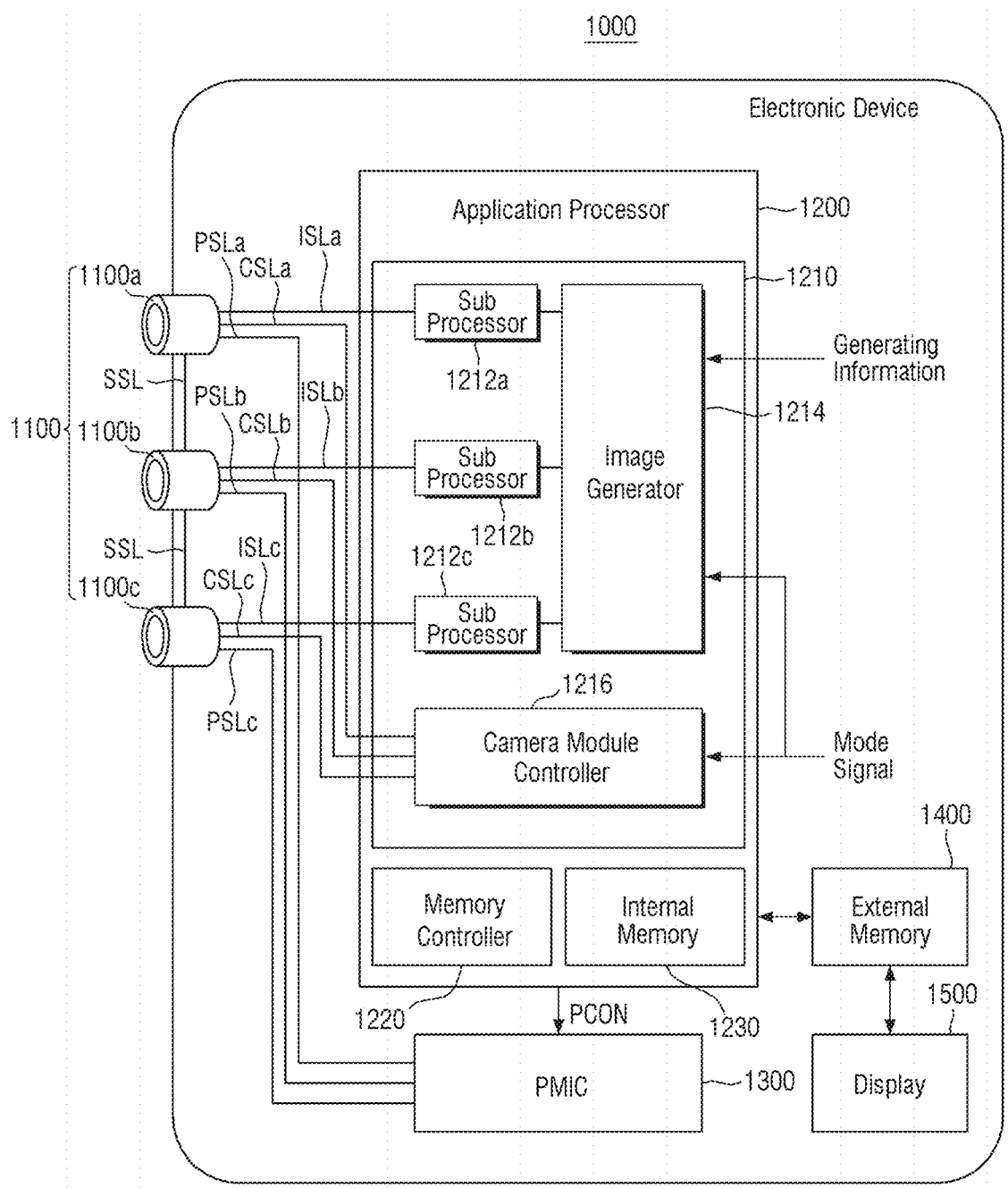
FIG. 17 is a block diagram of an electronic device including a multi-camera module.
Figure 18:
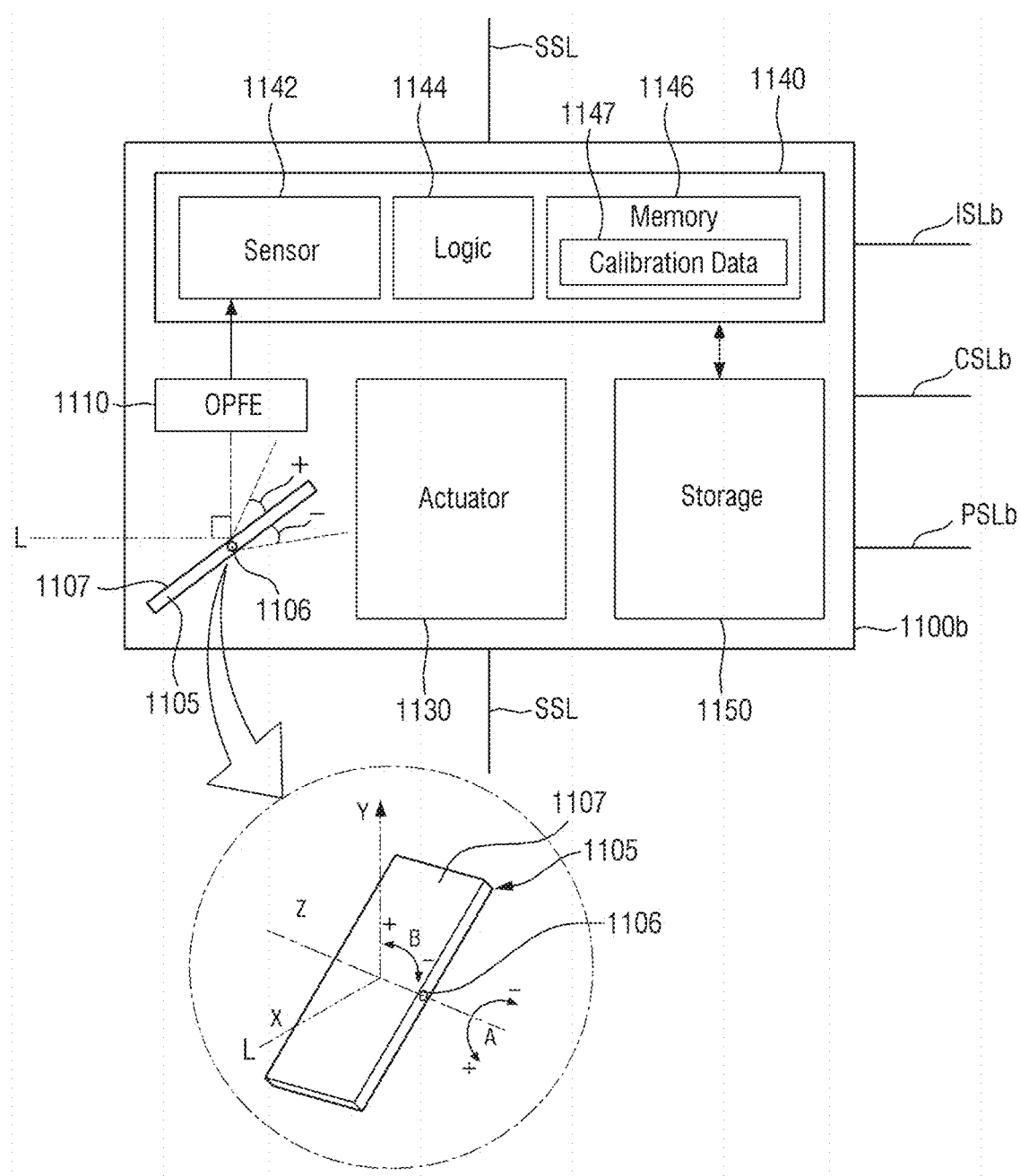
FIG. 18 is a detailed block diagram of the camera module of FIG. 17.

FIG. 17 is a block diagram of an electronic device including a multi-camera module. FIG. 18 is a detailed block diagram of the camera module of FIG. 17.

Referring to FIG. 17, an electronic device 1000 may include a camera module group 1100, an application processor 1200, a power management integrated circuit PMIC 1300, and an external memory 1400.

The camera module group 1100 may include a plurality of camera modules 1100a, 1100b, and 1100c. Although the drawing shows an embodiment in which three camera modules 1100a, 1100b, and 1100c are disposed, the embodiments are not limited thereto. In some embodiments, the camera module group 1100 may include only two camera modules. In addition, in some embodiments, the camera module group 1100 may include n camera modules, where n is a natural number equal to or greater than 4.

Hereinafter, a detailed configuration of the camera module 1100b will be described in more detail with reference to FIG. 18, but the following description may be equally applied to other camera modules 1100a and 1100c according to an embodiment.

Referring to FIG. 18, the camera module 1100b may include a prism 1105, an optical path folding element (hereinafter, "OPFE") 1110, an actuator 1130, an image sensing device 1140, and a storage 1150.

The prism 1105 may include a reflective surface 1107 including a light reflective material to change a path of light L incident from the outside.

In some embodiments, the prism 1105 may change the path of the light L incident in a first direction X to a second direction Y perpendicular to the first direction X. In addition, the prism 1105 may rotate the reflective surface 1107 of the light reflective material in an A direction about a central axis 1106 or rotate the central axis 1106 in a B direction to change the path of the light L incident in the first direction X to the second direction Y perpendicular to the first direction X. The OPFE 1110 may also move in a third direction Z perpendicular to the first direction X and the second direction Y.

In some embodiments, a maximum rotation angle of the prism 1105 in the A direction may be 15 degrees or less in a positive (+) A direction and greater than 15 degrees in a negative (−) A direction, but the embodiments are not limited thereto.

In some embodiments, the prism 1105 may move at about 20 degrees, between 10 degrees and 20 degrees, or between 15 degrees and 20 degrees in a plus (+) B direction or a minus (−) B direction, wherein the angle of movement may move at the same angle or almost the same angle in a range of about 1 degree in the plus (+) B direction or the minus (−) B direction.

In some embodiments, the prism 1105 may move the reflective surface 1107 of the light reflective material in the third direction (e.g., the Z direction) parallel to an extension direction of the central axis 1106.

The OPFE 1110 may include, for example, an optical lens consisting of m number of groups, where m is a natural number. The m lenses may move in the second direction Y to change an optical zoom ratio of the camera module 1100b. For example, when a basic optical zoom ratio of the camera module 1100b is W, when m optical lenses included in the OPFE 1110 are moved, the optical zoom ratio of the camera module 1100b may be changed to an optical zoom ratio of 3 W, 5 W, or 5 W or more.

The actuator 1130 may move the OPFE 1110 or an optical lens (hereinafter, referred to as an optical lens) to a specific position. For example, the actuator 1130 may adjust a position of the optical lens so that an image sensor 1142 is positioned at a focal length of the optical lens for accurate sensing.

The image sensing device 1140 may include the image sensor 1142, a control logic 1144, and a memory 1146. The image sensor 1142 may sense an image of a sensing target using the light L provided through the optical lens. The control logic 1144 may control the overall operation of the camera module 1100b. For example, the control logic 1144 may control the operation of the camera module 1100b according to a control signal provided through a control signal line CSLb.

The memory 1146 may store information used in the operation of the camera module 1100b, such as calibration data 1147. The calibration data 1147 may include information used by the camera module 1100b to generate image data using the light L provided from the outside. The calibration data 1147 may include, for example, information about a degree of rotation described above, information about the focal length, information about an optical axis, and the like. When the camera module 1100b is implemented in a form of a multi-state camera in which the focal length is changed according to the position of the optical lens, the calibration data 1147 may include a focal length value for each position (or state) of the optical lens, as well as information related to auto focusing.

The storage 1150 may store image data sensed by the image sensor 1142. The storage 1150 may be disposed outside the image sensing device 1140 and implemented in a stacked form with a sensor chip constituting the image sensing device 1140. In some embodiments, the storage 1150 may be implemented as an electrically erasable programmable read-only memory (EEPROM), but the embodiments are not limited thereto.

Referring to FIGS. 17 and 18 together, in some embodiments, each of the plurality of camera modules 1100a, 1100b, and 1100c may include the actuator 1130. Accordingly, each of the plurality of camera modules 1100a, 1100b, and 1100c may include the same or different calibration data 1147 according to the operation of the actuator 1130 included therein.

In some embodiments, one camera module (e.g., 1100b) among the plurality of camera modules 1100a, 1100b, and 1100c may have a form of a folding lens that includes the prism 1105 and the OPFE 1110 described above, and the remaining camera modules (e.g., 1100a and 1100c) may have a vertical form in which the prism 1105 and the OPFE 1110 are not included, but the embodiments are limited thereto.

In some embodiments, one camera module (e.g., 1100c) among the plurality of camera modules 1100a, 1100b, and 1100c, for example, may be a depth camera having a vertical form that extracts depth information using infrared ray (IR). In this case, the application processor 1200 may merge image data provided from the depth camera and image data provided from another camera module (e.g., 1100a or 1100b) to generate a 3D depth image.

In some embodiments, at least two camera modules (e.g., 1100a and 1100b) among the plurality of camera modules 1100a, 1100b, and 1100c may have different fields of view (e.g., different focal lengths and/or viewing angles). In this case, for example, optical lenses of at least two camera modules (e.g., 1100a and 1100b) among the plurality of camera modules 1100a, 1100b, and 1100c may be different from each other, but the embodiments are not limited thereto.

In addition, in some embodiments, viewing angles of the plurality of camera modules 1100a, 1100b, and 1100c may be different from each other. In this case, the optical lenses included in the plurality of camera modules 1100a, 1100b, and 1100c may also be different from each other, but the embodiments are not limited thereto.

In some embodiments, each of the plurality of camera modules 1100a, 1100b, and 1100c may be physically separated from each other. For example, the sensing region of one image sensor 1142 might not be divided and used by the plurality of camera modules 1100*a*, 1100*b*, and 1100*c*, but rather an independent image sensor 1142 may be disposed inside each of the plurality of camera modules 1100*a*, 1100*b*, and 1100*c*.

Referring again to FIG. 17, the application processor 1200 may include an image processing device 1210, a memory controller 1220, and an internal memory 1230. The application processor 1200 may be implemented separately from the plurality of camera modules 1100*a*, 1100*b*, and 1100*c*. For example, the application processor 1200 and the plurality of camera modules 1100*a*, 1100*b*, and 1100*c* may be separately implemented as separate semiconductor chips.

The image processing device 1210 may include a plurality of sub processors 1212*a*, 1212*b*, and 1212*c*, an image generator 1214, and a camera module controller 1216.

The image processing device 1210 may include the plurality of sub processors 1212*a*, 1212*b*, and 1212*c* in a number corresponding to the number of the plurality of camera modules 1100*a*, 1100*b*, and 1100*c*.

Image data generated from each of the camera modules 1100*a*, 1100*b*, and 1100*c* may be provided to the corresponding sub processors 1212*a*, 1212*b*, and 1212*c* through separate image signal lines ISLa, ISLb, and ISLc. For example, the image data generated from the camera module 1100*a* may be provided to the sub processor 1212*a* through the image signal line ISLa, the image data generated from the camera module 1100*b* may be provided to the sub processor 1212*b* through the image signal line ISLb, and the image data generated from the camera module 1100*c* may be provided to the sub processor 1212*c* through the image signal line ISLc. Such image data transmission may be performed using, for example, a camera serial interface (CSI) and/or based on a mobile industry processor interface (MIPI), but the embodiments are not limited thereto.

Meanwhile, in some embodiments, one sub processor may correspond to the plurality of camera modules. For example, the sub processor 1212*a* and the sub processor 1212*c* might not be separately implemented as shown in the drawing, but may be integrated into one sub processor, and the image data provided from the camera module 1100*a* and the camera module 1100*c* may be selected through a selection element (e.g., a multiplexer) or the like, and then provided to the integrated sub processor.

The image data provided to each of the sub processors 1212*a*, 1212*b*, and 1212*c* may be provided to the image generator 1214. The image generator 1214 may generate an output image using the image data provided from each of the sub processors 1212*a*, 1212*b*, and 1212*c* according to image generating information or a mode signal.

For example, the image generator 1214 may merge at least some of the image data generated from the camera modules 1100*a*, 1100*b*, and 1100*c* having different viewing angles according to the image generating information or the mode signal to generate the output image. Additionally or alternatively, the image generator 1214 may generate the output image by selecting any one of the image data generated from the camera modules 1100*a*, 1100*b*, and 1100*c* having different viewing angles according to the image generating information or the mode signal.

In some embodiments, the image generating information may include a zoom signal (or zoom factor). In addition, in some embodiments, the mode signal may be, for example, a signal based on a mode selected by a user.

When the image generating information is the zoom signal (zoom factor), and each of the camera modules 1100*a*, 1100*b*, and 1100*c* has a different field of view (viewing angle), the image generator 1214 may perform different operations according to a type of the zoom signal. For example, when the zoom signal is a first signal, after merging the image data output from the camera module 1100*a* and the image data output from the camera module 1100*c*, the image processing system may generate the output image by using the merged image signal and the image data output from the camera module 1100*b* that wasn't used for merging. When the zoom signal is a second signal different from the first signal, the image generator 1214 does not perform such image data merging and selects any one of the image data output from each of the camera modules 1100*a*, 1100*b*, and 1100*c*, thereby generating the output image. However, the embodiments are not limited thereto, and a method of processing image data may be modified and implemented as needed.

In some embodiments, the image generator 1214 may generate merged image data having an increased dynamic range by receiving a plurality of image data having different exposure times from at least one of the plurality of sub processors 1212*a*, 1212*b*, and 1212*c* and performing high dynamic range (HDR) processing on the plurality of pieces of image data.

The camera module controller 1216 may provide a control signal to each of the camera modules 1100*a*, 1100*b*, and 1100*c*. The control signal generated from the camera module controller 1216 may be provided to the corresponding camera modules 1100*a*, 1100*b*, 1100*c* through separate control signal lines CSLa, CSLb, and CSLc.

Any one of the plurality of camera modules 1100*a*, 1100*b*, and 1100*c* may be designated as a controlling camera (e.g., 1100*b*) according to the image generating information including the zoom signal or the mode signal, and the remaining camera modules (e.g., 1100*a* and 1100*c*) may be designated as dependent cameras. Such information may be included in the control signal and provided to the corresponding camera modules 1100*a*, 1100*b*, and 1100*c* through the separate control signal lines CSLa, CSLb, and CSLc.

as the operation of a camera module as a controlling camera or as a dependent camera may be changed according to a zoom factor or an operation mode signal. For example, when a viewing angle of the camera module 1100*a* is greater than that of the camera module 1100*b* and the zoom factor indicates a low zoom ratio, the camera module 1100*b* may operate as the controlling camera, and the camera module 1100*a* may operate as the dependent camera. On the contrary, when the zoom factor indicates a high zoom ratio, the camera module 1100*a* may operate as the controlling camera and the camera module 1100*b* may operate as the dependent camera.

In some embodiments, the control signal provided from the camera module controller 1216 to each of the camera modules 1100*a*, 1100*b*, and 1100*c* may include a sync enable signal. For example, when the camera module 1100*b* is the controlling camera and the camera modules 1100*a* and 1100*c* are the dependent cameras, the camera module controller 1216 may transmit the sync enable signal to the camera module 1100*b*. The camera module 1100*b* receiving the sync enable signal may generate a sync signal based on the received sync enable signal and provide the generated sync signal to the camera modules 1100*a* and 1100*c* through a sync signal line SSL. The camera module 1100*b* and the camera modules 1100*a* and 1100*c* may be synchronized with the sync signal to transmit the image data to the application processor 1200.

In some embodiments, the control signal provided from the camera module controller 1216 to the plurality of camera modules 1100*a*, 1100*b*, and 1100*c* may include mode information according to the mode signal. Based on the mode information, the plurality of camera modules 1100*a*, 1100*b*, and 1100*c* may operate in a first operation mode and a second operation mode, where the first and second operation modes correspond to different sensing speeds.

The plurality of camera modules 1100*a*, 1100*b*, and 1100*c* may generate an image signal at a first speed (e.g., generate an image signal having a first frame rate) in the first operation mode and encode the image signal at a second speed higher than the first speed (e.g., encode an image signal having a second frame rate higher than the first frame rate) and may transmit the encoded image signal to the application processor 1200. In some embodiments, the second speed may be 30 times or less the first speed.

The application processor 1200 may store the received image signal, e.g., the encoded image signal, in the internal memory 1230 provided therein or in the external memory 1400 outside the application processor 1200, and thereafter, read and decode the encoded image signal from the internal memory 1230 or the external memory 1400, and may display image data generated based on the decoded image signal. For example, a corresponding sub processor among the plurality of sub processors 1212*a*, 1212*b*, and 1212*c* of the image processing device 1210 may perform decoding and also perform image processing on the decoded image signal.

The plurality of camera modules 1100*a*, 1100*b*, and 1100*c* may generate an image signal at a third speed lower than the first speed in the second operation mode (e.g., generate an image signal having a third frame rate lower than the first frame rate) and transmit the image signal to the application processor 1200. The image signal provided to the application processor 1200 may be an unencoded signal. The application processor 1200 may perform image processing on the received image signal or may store the image signal in the internal memory 1230 or the external memory 1400.

The PMIC 1300 may supply power, for example, a power supply voltage, to each of the plurality of camera modules 1100*a*, 1100*b*, and 1100*c*. For example, under the control of the application processor 1200, the PMIC 1300 may supply first power to the camera module 1100*a* through a power signal line PSLa, supply second power to the camera module 1100*b* through a power signal line PSLb, and supply third power to the camera module 1100*c* through a power signal line PSLc.

The PMIC 1300 may generate power corresponding to each of the plurality of camera modules 1100*a*, 1100*b*, and 1100*c* in response to a power control signal PCON from the application processor 1200 and may also adjust a level of the power. The power control signal PCON may include a power adjustment signal for each operation mode of the plurality of camera modules 1100*a*, 1100*b*, and 1100*c*. For example, the operation mode may include a low power mode, and in this case, the power control signal PCON may include information about the low power mode operation and information about a set power level for one or more cameras. Levels of power provided to each of the plurality of camera modules 1100*a*, 1100*b*, and 1100*c* may be the same as or different from each other. In addition, the levels of the power may be changed dynamically.

The pre-processing processor 192, the image processor 194, and the post-processing processor 196 described using FIGS. 1 to 16 may be implemented in the control logic 1144 in the camera module 1100 of FIG. 18, or may be implemented in the sub processor 1212 or the image generator 1214 of FIG. 17. The application processor 200 described with reference to FIGS. 1 to 16 may correspond to the application processor 1200 of FIG. 17.

The image processing system described herein may produce an output image with increased quality. For example, by applying one or more functions to the raw image data, image data from a tetra-pattern of pixels may be remosaiced into a Bayer pattern with preserved detail and minimal errors. The one or more functions may compensate each other so as to not increase errors or artifacting in a particular luminance range.

Embodiments of the present disclosure have been described with reference to the accompanying drawings, but the present disclosure is not limited to the embodiments and may be embodied in various different forms. It will be understood by those of skill in the art that various changes in form and details may be made without departing from the spirit and scope of the present disclosure as set forth in the following claims. Therefore, it should be construed that the embodiments described above are in all respects and are not limiting.

What is claimed is:

1. An image sensor comprising:
   a sensor including a plurality of pixels and configured to capture incident light and generate raw image data;
   a pre-processing processor configured to generate first image data in a first format by applying a first function to the raw image data;
   an image processor configured to receive the first image data and generate second image data having a second format different from the first format using a machine learning model that is trained to remosaic image data in the first format to the second format; and
   a post-processing processor configured to generate third image data by applying a second function to the second image data,
   wherein the first function is a non-linear function, and, when applied to the raw image data, amplifies luminance in low-luminance portions of the raw image data, and reduces luminance in high-luminance portions of the raw image data.

2. The image sensor of claim 1, wherein the second function is a non-linear function.

3. The image sensor of claim 1, wherein the second function is an inverse function of the first function.

4. The image sensor of claim 1, wherein the first image data comprises tetra data, and the second image data comprises Bayer data.

5. The image sensor of claim 1, wherein the first image data comprises nona data, and the second image data comprises Bayer data.

6. An image processing system comprising:
   an image sensor including a plurality of pixels;
   a pre-processing processor configured to generate first image data in a first format by applying a first function to raw image data generated from the plurality of pixels,
   an image processor configured to receive the first image data and generate second image data having a second format different from the first format by applying a machine learning model to the first image data that is trained to remosaic image data in the first format to the second format, and
   a post-processing processor configured to generate third image data by applying a second function to the second image data; and an image signal processor configured to receive the third image data as input image data and generate output image data by applying a third function to the input image data, wherein the third function is a non-linear function.

7. The image processing system of claim 6, wherein the first function is a non-linear function.

8. The image processing system of claim 6, wherein the second function is a non-linear function.

9. The image processing system of claim 6, wherein the second function is an inverse function of the first function.

10. The image processing system of claim 6, wherein the third function is the same as the first function.

11. The image processing system of claim 6, wherein the image signal processor performs gamma correction by applying the third function to the input image data.

12. The image processing system of claim 6, wherein the image sensor generates raw input image data by applying the machine learning model to the raw image data generated from the plurality of pixels according to a control signal and outputs the raw input image data.

13. The image processing system of claim 12, wherein the image signal processor receives the raw input image data and applies the third function to the raw input image data to output raw output image data, and wherein the image processing system further includes a processor configured to receive the raw input image data and the raw output image data, calculate the first function and the second function, and transmit the first function and the second function to the image sensor.

14. The image processing system of claim 6, further comprising a processor configured to receive the third function from a user interface, calculate the first function and the second function from the third function, and transmit the first function and the second function to the image sensor.

15. The image processing system of claim 6, wherein the first function, the second function, and the third function are provided from outside of the image processing system.

16. An image processing system comprising:

an image sensor including a pre-processing processor configured to generate first image data in a first format by applying a first function to raw image data generated from a plurality of pixels, an image processor configured to receive the first image data and generate second image data having a second format different from the first format by applying a deep learning model to the first image data that is trained to remosaic image data in the first format to the second format, and a post-processing processor configured to generate third image data by applying a second function to the second image data; and an image signal processor configured to receive the third image data as input image data and generate output image data by applying a third function to the input image data, wherein first function, the second function, and the third function are non-linear functions.

17. The image processing system of claim 16, wherein the first function is the same as the third function.

18. The image processing system of claim 16, wherein the second function is an inverse function of the first function.

\* \* \* \* \*